United States Patent [19]

Buckman

[11] 4,043,489
[45] Aug. 23, 1977

[54] COMBINATION VENT AND SHUT OFF VALVE

[76] Inventor: Thomas P. Buckman, 11561 Shelly Vista Drive, Tujunga, Calif. 91042

[21] Appl. No.: 649,252

[22] Filed: Jan. 15, 1976

[51] Int. Cl.² .............................................. F16K 24/04
[52] U.S. Cl. .................................... 222/397; 222/514
[58] Field of Search ............... 222/397, 518, 514, 522, 222/531, 537, 402.1; 251/342; 137/854

[56] References Cited

U.S. PATENT DOCUMENTS 3,752,370  8/1973  Davenport ........................... 222/514

Primary Examiner—Robert B. Reeves
Assistant Examiner—John P. Shannon
Attorney, Agent, or Firm—Witherspoon, Lane & Hargest

[57] ABSTRACT

A combination vent and shut off valve for use in conjunction with a vessel having pressurized fluid therein, comprising a stem having a hollow cylindrical body portion with its inner end connected to an opening in the vessel. A stem head portion extends from the outer end of the stem body, and has a hole extending therethrough in alignment with the hollow body, the head portion having an outer diameter greater than that of the hollow body so that a shoulder is formed where the stem body and stem head meet. The outer end of the head terminates in an annular guide member having a diameter greater than the head. The head is provided with a fluid feed slot connecting the head hole with the outside of the head. A resilient cap is assembled onto the stem for reciprocation thereon and comprises a cylindrical hollow body sized to slidably fit over the stem head guide, said cap body having a closed end and an open end. A resilient annular flange extends from the inner face of the closed end of the cap body and resiliently engages the top of the stem head guide. The open end of the body has an internal annular closure member fitting loosely around the stem body. The closure member snugly engages the outer edge of the stem shoulder under the pressure created by the cap flange bearing against the top of the stem guide whereby upon the directing of pressure on the closed end of the cap toward the vessel, the flange will be compressed and allow the cap closure to move away from the stem shoulder.

3 Claims, 3 Drawing Figures

COMBINATION VENT AND SHUT OFF VALVE

SUMMARY OF THE INVENTION

This invention relates to a combination vent and shut off valve adapted for use in conjunction with a vessel having pressurized fluid therein. Basically, combination vent and shut off valves as used on pressure vessels are well known and numerous in the valve art. Many of the valve combinations presently on the market involve rather complicated mechanisms which naturally means an expensive valve. The matter of ease of assembly and operation together with long range reliability are also factors which must be considered in the selection of a valve such as this.

In view of the above, it is an object of this invention to provide a combination vent and shut off valve having a minimum of working parts to accomplish the desired valve functions.

It is another object to provide a combination vent and shut off valve which is quite reliable and easy to operate.

It is yet another object to provide a combination vent and shut off valve which is inexpensive to manufacture and requires virtually no maintenance.

The above and other objects will become more apparent when taken in conjunction with the following detailed description and drawings.

IN THE DRAWING

DETAILED DESCRIPTION OF THE INVENTION

Figure 1:
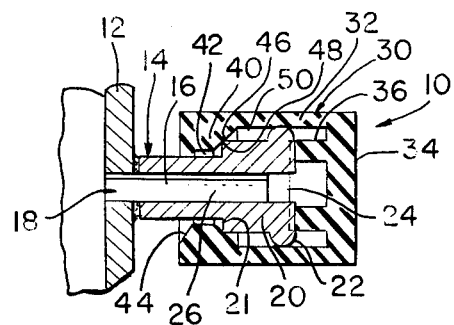
FIG. 1 is a cross sectional view of the valve of this invention shown installed on the wall of a pressure vessel.
Figure 2:
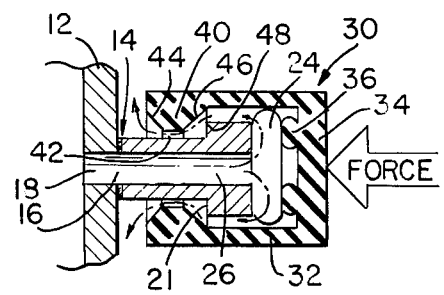
FIG. 2 is a cross sectional view similar to FIG. 1 but rotated 90° to show additional structural features.

The preferred embodiment of the invention is illustrated in FIGS. 1 and 2 of the drawing. The entire valve assembly 10 is secured to the wall 12 of a pressure vessel, more particularly, the hollow cylindrical stem body 14 is secured to the wall 12 of the pressure vessel by any suitable means, one of the means being welding. The hole 16 in the stem body 14 is aligned with an opening 18 in the vessel wall 12 so that pressurized fluid within the vessel will be in fluid communication with the valve.

The stem head 20 extends from the outer end of the stem body 14 and is larger in diameter than the stem body thereby providing a shoulder 21 where the stem body and stem head meet. The outer end of the head 20 is formed into an annular guide 22 having a diameter greater than that of the stem head 20. A fluid feed slot 24 is formed in the stem head 20 to provide fluid communication between the pressure vessel and the outer end of the stem by way of hole 18 in the pressure vessel wall 12, the hole 16 in the stem body 14, the hole 26 in the stem head 20, and transverse slot 24 to an area outside the stem head and guide.

A resilient valve cap 30 is assembled onto the stem 14, said cap 30 comprises a cylindrical hollow body 32 sized to fit over and slidably engage the stem head guide 22. The cap body 32 is closed by end wall 34 which wall has an inwardly directed resilient annular flange 36 extending from the inner face 38 of said end wall. The resilient flange 36 engages the top of the stem guide 22 to cause the cap 30 to tend to move outwardly away from the stem head 20. The open end of the valve cap 30 is provided with an annular closure member 40 extending inwardly from the inner face of the cap body 32 and terminating so as to leave an opening which will provide a space 42 between the closure member 40 and the stem body 14. The closure member 40 is provided by bevelled faces 44 and 46, respectively. Face 46 engages peripheral shoulder edge 48 to seal off the space 42 which acts as an outlet from the inner chamber 50 of the valve which is fed fluid at all times through fluid feed slot 24 in the stem head guide 22.

The operation of the valve combination is quite simple and effective. The valve is shown in closed position in FIG. 1 with the resilient annular flange 36 bearing against the stem head guide 22 to force the cap 30 outwardly so that shoulder edge 48 will be engaged by bevelled face 46 to prevent fluid flow from valve chamber 50 out through space 42. As previously stated, chamber 50 is filled with fluid from the pressure vessel at all times.

In order to open the valve, force is exerted inwardly on cap 30 as indicated by the arrow in FIG. 2 to compress the flange 36 and allow the cap 30 to move inwardly thus moving bevelled face 46 away from shoulder edge 48 to create an opening for fluid flow. Release of pressure causes immediate return of the cap 30 to the closed position as shown in FIG. 1.

Figure 3:
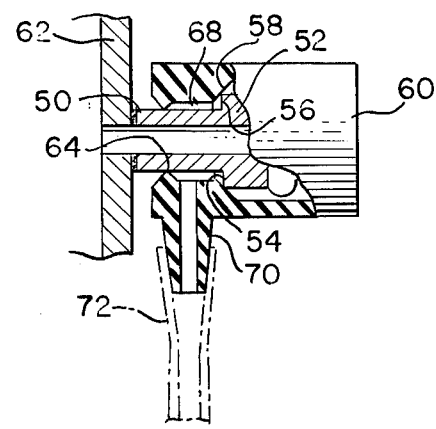
FIG. 3 is a cross sectional view of a second embodiment of the combination vent and shut off valve.

A second embodiment is shown in FIG. 3, the main difference between this device and that described in FIGS. 1 and 2 is the addition of a drain spout and an associated seal arrangement. More particularly, the stem body 50 and stem head 52 form a shoulder 54 having a peripheral shoulder edge 56 which cooperates with bevelled face 58 on cap 60 to seal off flow from the pressure vessel 62. Additionally, the cap 60 is provided with an inwardly extending circular seal 64 which engages the stem body 50 to form a discharge chamber 68. Discharge spout 70 is formed in cap 60 to provide fluid communication between the discharge chamber 68 and the outside area. A tube 72 may be attached to the spout 70 to direct the flow of discharge fluid.

In use, the FIG. 3 embodiment works exactly like the device of FIG. 1, namely, pressing inward on the cap 60 causes bevelled face 58 to move away from shoulder edge 56 to allow fluid from the pressurized vessel 62 to flow therepast into discharge chamber 68 and out discharge spout 70. Obviously, seal 64 slides back and forth in sealing engagement with stem body 50.

I claim:

1. A combination vent and shut off valve adapted for use in conjunction with a vessel having pressurized fluid therein, said valve comprising a stem having a hollow cylindrical body portion with its inner end adapted for connection to an opening in the vessel whereby fluid communication is established between the inner portion of the pressure vessel and the hollow body portion of the stem, a stem head portion extending from the outer end of the stem body, said head portion having a hole extending therethrough in alignment with the hollow body, the head portion having an outer diameter greater than that of the hollow body so that a shoulder is formed where the stem body and stem head meet, the outer end of the head terminating in an annular guide member having a diameter greater than the head, said head having a fluid feed slot connecting the head hole with the outside of the head, a cap assembled onto the stem for reciprocation thereon, said cap comprising a cylindrical hollow body sized to slidably fit over the stem head guide, said cap body having a closed end and an open end, a resilient annular flange extending from the inner face of the closed end of the cap body and resiliently engaging the top of the stem head guide, the open end of the body having an internal annular closure member fitting loosely around the stem body, the closure member snugly engaging the outer edge of the stem shoulder under the pressure created by the cap flange bearing against the top of the stem guide whereby upon the directing of pressure on the closed end of the cap toward the vessel, the flange will be compressed and allow the bevelled face of the cap closure to move away from the stem shoulder to create a space therebetween to allow flow from the vessel through the stem, out through the stem slot and then out through the aforesaid space.

2. The invention as set forth in claim 1 and wherein the cap is provided with an inwardly extending seal engaging the stem body near its inner end to form a discharge chamber between the seal and the closing provided by the cap closure member in contact with the outer edge of the stem shoulder, and fluid outlet means connecting the discharge chamber to the outside.

3. The invention as set forth in claim 1 and wherein the closure member is provided with a bevelled face adapted to snugly engage the outer edge of the stem shoulder.

* * * * *